United States Patent [19]

Tanaka et al.

[11] Patent Number: 4,639,099

[45] Date of Patent: Jan. 27, 1987

[54] OPTICAL INSTRUMENT

[75] Inventors: Kazuto Tanaka; Haruo Kakizawa; Kouichi Nagata, all of Saitama, Japan

[73] Assignee: Fuji Photo Optical Co., Ltd., Saitama, Japan

[21] Appl. No.: 775,248

[22] Filed: Sep. 12, 1985

[30] Foreign Application Priority Data

Oct. 6, 1984 [JP] Japan .................. 59-210096

[51] Int. Cl.⁴ ............................. G02B 23/00
[52] U.S. Cl. .................................. 350/538
[58] Field of Search ............... 350/257, 410, 538, 545, 350/576

[56] References Cited

U.S. PATENT DOCUMENTS 2,946,255  7/1960  Bolay .............................. 350/538
2,953,970  9/1960  Maynard ....................... 350/257
4,420,239  12/1983  Yasuyuki et al. ............. 350/257

Primary Examiner—John K. Corbin
Assistant Examiner—Vincent J. Lemmo
Attorney, Agent, or Firm—Gerald J. Ferguson, Jr.; Michael P. Hoffman; Ronni S. Malamud

[57] ABSTRACT

An optical instrument such as a binoculars has an eyepiece lens unit detachably mounted on an eyepiece mount and comprising an eyepiece lens assembly including an eyepiece lens and an image intensifier tube assembly separably coupled to the eyepiece lens assembly. The image intensifier tube assembly includes an image intensifier tube having a light-sensitive surface lying at the focal plane of the objective lens and a phosphor screen lying at the focal point of the eyepiece lens. When the optical instrument is used to enable the user to see a dark object, the eyepiece lens unit with the eyepiece lens assembly and the image intensifier tube assembly coupled together is attached to the eyepiece mount. For the user to see a bright object, the image intensifier tube assembly is detached from the eyepiece lens assembly, and the eyepiece lens assembly is attached directly to the eyepiece mount.

4 Claims, 3 Drawing Figures

OPTICAL INSTRUMENT

BACKGROUND OF THE INVENTION

1. Field of the Invention

The present invention relates to an optical instrument such as a telescope, a binoculars or the like, and more particularly to such an optical instrument for enabling the user to visually observe objects in a dark field which have small luminance that could not be perceived directly by the human eye.

2. Description of the Prior Art

It has been known to incorporate an image intensifier tube in an optical instrument such as a telescope or a binoculars for the purpose of enabling people to visually observe dark objects which could not be perceived directly by the human eye in darkness. However, such an optical instrument cannot be used in bright light since the image intensifier would be damaged by the intense light impinging thereon. The utility of the optical instrument is poor as it can only be used in the dark.

SUMMARY OF THE INVENTION

In view of the drawback of the prior optical instrument of the type described, it is an object of the present invention to provide an optical instrument for enabling the user to see objects in both dark and bright places.

According to the present invention, there is provided an optical instrument including an eyepiece lens unit detachably mounted on an eyepiece mount supported on a casing and comprising an eyepiece lens assembly including an eyepiece lens and an image intensifier tube assembly separably coupled to the eyepiece lens assembly. The image intensifier tube assembly includes an image intensifier tube having a light-sensitive surface lying at the focal plane of the objective lens and a phosphor screen lying at the focal point of the eyepiece lens. The eyepiece lens assembly has a first means for separably coupling the eyepiece lens assembly to the eyepiece mount without the image intensifier tube assembly disposed therebetween, and the image intensifier tube assembly has a second means for separably coupling the image intensifier tube assembly to the eyepiece mount with the eyepiece lens assembly attached to the image intensifier tube assembly. The first and second means are relatively positioned so that when the eyepiece lens assembly is coupled directly to the eyepiece mount without the image intensifier tube assembly disposed therebetween, the focal point of the eyepiece lens coincides with the focal plane of the objective lens.

When the user wants to use the optical instrument to see an object in a dark place, the eyepiece lens unit with the eyepiece lens assembly and the image intensifier tube assembly coupled together is attached to the eyepiece mount. When the optical instrument is to be employed for the user to see an object in a bright place, the image intensifier tube assembly is detached from the eyepiece lens assembly, and the eyepiece lens assembly is attached directly to the lens mount.

The above and other objects, features and advantages of the present invention will become more apparent from the following description when taken in conjunction with the accompanying drawings in which preferred embodiments of the present invention are shown by way of illustrative examples.

DESCRIPTION OF THE PREFERRED EMBODIMENT

Figure 1:
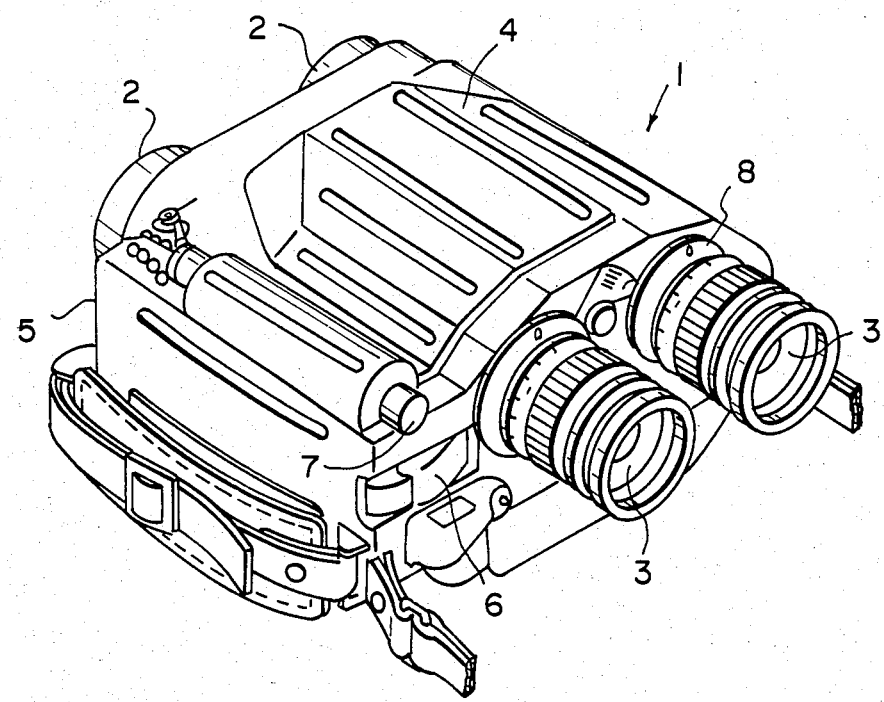
FIG. 1 is a perspective view of an optical instrument according to the present invention.

FIG. 1 shows an optical instrument according to the present invention. The optical instrument, generally designated by the reference numeral 1, is in the form of a binoculars including a pair of independent telescopic systems each having a pair of objective and eyepiece lenses 2, 3. The telescopic systems also include a pair of respective erecting prisms (not shown) each disposed between one pair of the objective and eyepiece lenses 2, 3 and having aligned optical axes for incident and exit light rays. The binocular 1 has a casing 4 in which the erecting prisms are swingably supported by a gimbal suspension device having a gyro motor.

Each of the eyepiece lenses 3, 3 is incorporated in an eyepiece lens unit including an image intensifier tube (described later) for enabling the user to observe dark objects through the binocular 1. The eyepiece lenses 3, 3 are removably mounted on the casing 4. A battery case 5 is detachably coupled by a fastener 6 to the casing 4 and accommodates a battery (not shown) for energizing the gyro motor and the image intensifier tubes. The battery case 5 supports thereon an on/off switch 7 for supplying electric power from the battery to the gyro motor and the image intensifier tubes. When the on/off switch 7 is turned on, the gyro motor starts rotating and the image intensifier tubes are energized.

Figure 2:
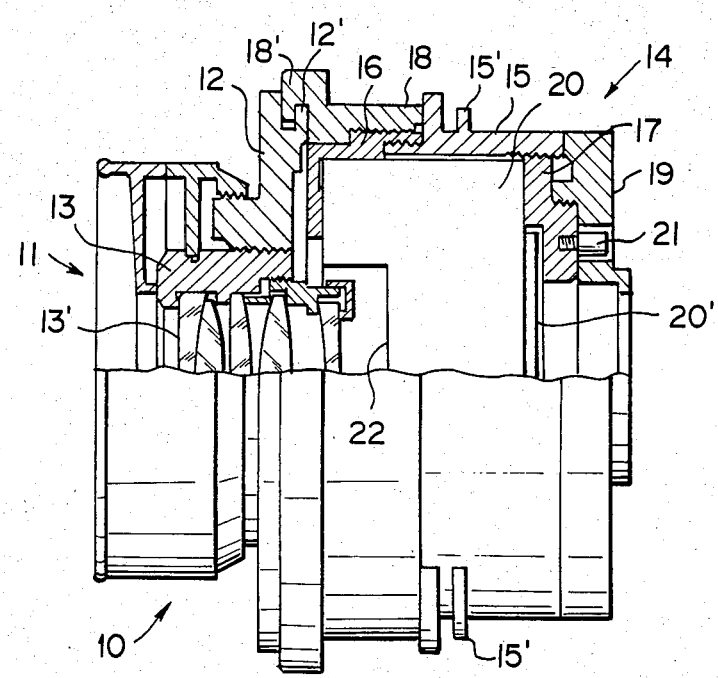
FIG. 2 is a fragmentary cross sectional view of an eyepiece lens unit in the optical instrument shown in FIG. 1.

FIG. 2 shows one of the eyepiece lens units which are of identical constructions. The eyepiece lens unit, generally denoted at 10 in FIG. 2, includes an eyepiece lens assembly 11 comprising a tubular body 12 having a plurality (three, for example) of circumferentially spaced bayonets 12', and a lens barrel 13 threaded in the tubular body 12 and holding an eyepiece lens system 13' comprising a group of lenses, which are collectively denoted by the reference numeral 3 in FIG. 1. The eyepiece lens unit 10 also includes an image intensifier tube assembly 14 composed of a first bayonet tubular body 15 having a plurality (three, for example) of circumferentially spaced bayonets 15' on its outer circumferential surface, an outer tubular body 16 threaded over an externally threaded end of the first bayonet tubular body 15, and an inner ring body 17 threaded in an internally threaded end of the first bayonet tubular body 15. The outer tubular body 16, the inner ring body 17, and the tubular body 15 jointly constitute a tubular housing which accommodates the image intensifier tube, indicated at 20. The image intensifier tube assembly 14 also has a second bayonet tubular body 18 threaded over the outer tubular body 16 and having a plurality (three, for example) of bayonets 18' engaging with the bayonets 15' of the first bayonet tubular body 15, and a protective ring 19 threaded over an externally threaded portion of the inner ring body 17. Two adjacent terminals 21 (only one shown) coupled to the image intensifier tube 20 are mounted on the inner ring body 17 for connection to a battery in the battery case 5, the terminals 21 being located within holes defined in the protecting ring 19.

The image intensifier tube 20 is of a known construction having a light-sensitive surface 20' for forming an image thereon and a phosphor screen 22 for producing a visual image in response to a photoelectron pattern produced by the light-sensitive surface 20'. The image intensifier tube 20 as disposed in the tubular housing is positionally adjustable in the direction of the optical axis by the outer tubular body 16 and the inner ring body 17 so that the light-sensitive surface 20' coincides with the focal plane of the objective lens 2 in the same telescopic system. The eyepiece lens assembly 11 is also positionally adjustable in the direction of the optical axis by the tubular body 12 and the lens barrel 13 so that the focal point of the eyepiece lens system 13' coincides with the phosphor screen 22 of the image intensifier tube 20. The axial distance between the bayonets 12' of the eyepiece lens assembly 11 and the bayonets 15' of the image intensifier tube 14 is adjusted to be equal to the distance between the light-sensitive surface 20' and the phosphor screen 22 of the image intensifier tube 20.

Figure 3:
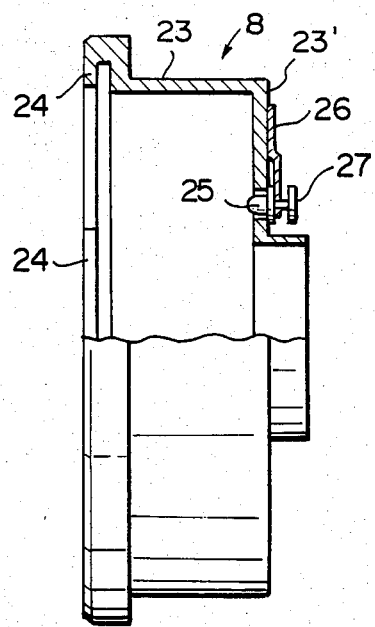
FIG. 3 is a fragmentary cross-sectional view of an eyepiece mount in the optical instrument of FIG. 1.

FIG. 3 shows an eyepiece mount 8 by which the eyepiece lens assembly 11 as separated from the image intensifier tube assembly 14 or the eyepiece lens unit 10 is mounted on the casing 4. The eyepiece mount 8 is disposed substantially entirely in the casing 4 except for a plurality (three, for example) of bayonets 24 on one axial end thereof. The eyepiece mount 8 comprises a tubular housing 23 having the bayonets 24 on its one axial end, the bayonets 24 being engageable selectively with the bayonets 12' of the eyepiece lens assembly 11 or the bayonets 15' of the image intensifier tube assembly 14. The tubular housing 23 includes a housing bottom 23' on which there is supported a pair of terminals 25 (only one shown) each having a round end normally urged to move slightly into the tubular housing 23 by a leaf spring 26 attached to the housing bottom 23'. The terminals 25 are positioned for electric contact with the respective terminals 21 (FIG. 2) disposed in the protective ring 19. The terminals 25 are connected by wires 27 to the battery in the battery case 5.

When the user wants to use the binoculars 1 to see an object in the dark, the eyepiece lens units 10 are positioned partly in the eyepiece mounts 8 and fixed thereto by interengagement between the bayonets 15', 24. At this time, the terminals 21, 25 are electrically coupled to connect the image intensifier tubes 20 to the battery, and the telescopic systems are optically set up. Now, an image of the object entering through the objective lenses 2 is brightened by the image intensifier tubes 20 and such an intensified image can be seen by the user through the eyepiece lens assemblies 11.

When the binoculars 1 is to be used in a bright place, the eyepiece lens units 10 are detached from the eyepiece mounts 8, and then the bayonets 12', 18' are separated from each other to disconnect the eyepiece lens assemblies 11 from the image intensifier tube assemblies 14. Then, the eyepiece lens assemblies 11 are joined to the eyepiece mounts 8 by the bayonets 12', 24. Since the distance between the bayonets 15', 18' is equal to the distance between the light-sensitive surface 20' and the phosphor screen 22 of the image intensifier tube 20, the focal point of the eyepiece lens system 13' coincides with the focal plane of the corresponding objective lens 2.

In the event that the eyepiece lens assembly 11 is directly mounted on the casing 4 without the image intensifier tube assembly 14 therebetween, the bottom (shown on the righthand side in FIG. 2) of the tubular body 12 is spaced a large distance from the round ends of the terminals 25 which slightly project into the body of the tubular housing 23. Therefore, the battery is prevented from being short-circuited.

With the arrangement of the present invention, therefore, the binoculars 1 can be used to enable the user to see objects in both dark and bright places simply by selectively using the image intensifier tube assembly 14.

The eyepiece lens assembly 11 and the image intensifier tube assembly 14 may be fixedly coupled together so that the eyepiece lens unit 10 will be employed as a permanently unitary device to be attached to the casing 4, and another eyepiece lens assembly 11 may be used for direct attachment to the casing 4. The bayonets in the foregoing embodiment may be replaced with other mounting means such as threaded coupling structures.

Although a certain preferred embodiment has been shown and described, it should be understood that many changes and modifications may be made therein without departing from the scope of the appended claims.

We claim:

1. An optical instrument comprising:
   (i) a casing;
   (ii) at least one telescopic system mounted in said casing and composed of objective and eyepiece lenses;
   (iii) an eyepiece mount supported on said casing;
   (iv) an eyepiece lens unit detachably mounted on said eyepiece mount and comprising an eyepiece lens assembly including said eyepiece lens and an image intensifier tube assembly separably coupled to said eyepiece lens assembly, said image intensifier tube assembly including an image intensifier tube having a light-sensitive surface lying at the focal plane of said objective lens and a phosphor screen lying at the focal point of said eyepiece lens, said eyepiece lens assembly having first means for separably coupling the eyepiece lens assembly to said eyepiece mount without said image intensifier tube assembly disposed therebetween, said image intensifier tube assembly having second means for separably coupling the image intensifier tube assembly to said eyepiece mount with said eyepiece lens assembly attached to said image intensifier tube assembly, said first and second means being relatively positioned so that when said eyepiece lens assembly is coupled directly to said eyepiece mount without said image intensifier tube assembly disposed therebetween, said focal point of said eyepiece lens coincides with said focal plane of said objective lens.

2. An optical instrument according to claim 1, wherein said eyepiece mount has third means for selective separable connection to said first means or said second means.

3. An optical instrument according to claim 1, wherein said image intensifier tube assembly has first terminals connected to said image intensifier tube, and said eyepiece mount has second terminals connected to a power supply disposed in said casing, said first and second terminals being connectable to each other when said image intensifier tube assembly is coupled to said eyepiece mount.

4. An optical instrument according to claim 2, wherein each of said first, second and third means comprises a plurality of circumferentially spaced bayonets.

* * * * *